(12) United States Patent
Shmueli et al.

(10) Patent No.: US 9,779,118 B2
(45) Date of Patent: Oct. 3, 2017

(54) LIVE DATABASE SCHEMA TREE CHANGE

(71) Applicant: Kenshoo Ltd., Tel Aviv (IL)

(72) Inventors: Yaniv Shmueli, Millburn, NJ (US); Roy Udassin, Givaataim (IL); Sagi Keren-Haselkorn, Tel Aviv (IL)

(73) Assignee: KENSHOO LTD., Tel-Aviv (IL)

( * ) Notice: Subject to any disclaimer, the term of this patent is extended or adjusted under 35 U.S.C. 154(b) by 18 days.

(21) Appl. No.: 14/660,643

(22) Filed: Mar. 17, 2015

(65) Prior Publication Data

US 2016/0283526 A1 Sep. 29, 2016

Related U.S. Application Data

(60) Provisional application No. 61/953,958, filed on Mar. 17, 2014.

(51) Int. Cl.
G06F 17/30 (2006.01)

(52) U.S. Cl.
CPC .. G06F 17/30297 (2013.01); G06F 17/30315 (2013.01); G06F 17/30327 (2013.01); G06F 17/30339 (2013.01)

(58) Field of Classification Search
USPC .......................... 707/639, 609, 790, 791, 797
See application file for complete search history.

(56) References Cited

U.S. PATENT DOCUMENTS

| | | | | |
|---|---|---|---|---|
| 5,295,256 A | * | 3/1994 | Bapat | G06F 17/30595 707/999.003 |
| 6,728,719 B1 | * | 4/2004 | Ganesh | G06F 17/3048 |
| 2003/0140308 A1 | * | 7/2003 | Murthy | G06F 17/30917 715/234 |
| 2004/0073582 A1 | * | 4/2004 | Spiegel | G06F 3/0619 |
| 2005/0187973 A1 | * | 8/2005 | Brychell, III | G06F 17/30917 |

* cited by examiner

*Primary Examiner* — Hung T Vy
(74) *Attorney, Agent, or Firm* — Lewis Roca Rothgerber Christie LLP

(57) ABSTRACT

A method for live database schema tree change, comprising: (a) providing a computerized database comprising: a parent database table and a child database table having a column configured to reference the parent database table; and (b) while the computerized database is live, operating a database management system (DBMS) in control of the computerized database, to: create an intermediate database table having a column configured to reference the parent database table; in the child database table: create a column configured to reference the intermediate database table, insert an identifier of the intermediate database table into all fields of the column configured to reference the intermediate database table, and overwrite all fields of the column configured to reference the parent database table with data from the fields of the column configured to reference the intermediate database table.

9 Claims, 3 Drawing Sheets

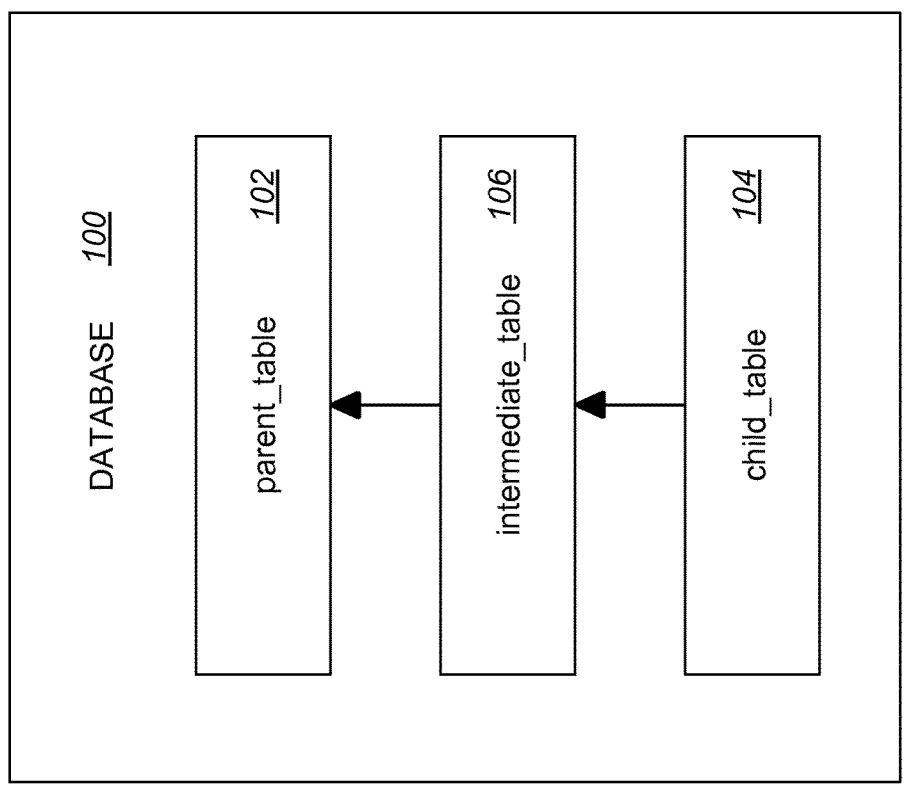

LIVE DATABASE SCHEMA TREE CHANGE

CROSS REFERENCE TO RELATED APPLICATIONS

This application claims the benefit of U.S. Provisional Patent Application No. 61/953,958 entitled "Online Schema Tree Change", filed Mar. 17, 2014, the contents of which are incorporated herein by reference in their entirety.

FIELD OF THE INVENTION

The invention relates to the field of computerized databases.

BACKGROUND

When upgrading or modifying the operation of an application server associated with a database management system (DBMS), it is usually desired to have little or no downtime during the upgrade or modification. Therefore, changes to the schema of the database need to be backward compatible, in the sense that existing application code can still properly address the DBMS until a new application code is fully deployed.

In such migration model, changes of adding new tables and columns are acceptable while altering or deleting columns and tables are forbidden. If these rules are not adhered to, the application server may suddenly, during migration, fail to address the database.

When the schema contains a tree ("hierarchical") model (often defined as nodes having a parent-child relationship), as common in relational database management systems (RDBMSs), such migration becomes challenging—especially when a new node has to be inserted in an intermediate location in the hierarchy.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method for live database schema tree change, comprising: (a) providing a computerized database comprising: a parent database table and a child database table having a column configured to reference the parent database table; and (b) while the computerized database is live, operating a database management system (DBMS) in control of the computerized database, to: create an intermediate database table having a column configured to reference the parent database table; in the child database table: create a column configured to reference the intermediate database table, insert an identifier of the intermediate database table into all fields of the column configured to reference the intermediate database table, and overwrite all fields of the column configured to reference the parent database table with data from the fields of the column configured to reference the intermediate database table.

Another embodiment provides a computer program product comprising a non-transitory computer-readable storage medium having program code embodied therewith, the program code executable by at least one hardware processor to: (a) communicate with a computerized database comprising: a parent database table and a child database table having a column configured to reference the parent database table; and (b) while the computerized database is live, operate a database management system (DBMS) in control of the computerized database, to: create an intermediate database table having a column configured to reference the parent database table; in the child database table: create a column configured to reference the intermediate database table, insert an identifier of the intermediate database table into all fields of the column configured to reference the intermediate database table, and overwrite all fields of the column configured to reference the parent database table with data from the fields of the column configured to reference the intermediate database table.

A further embodiment provides a system comprising: (a) a non-transitory storage device having stored thereon a computerized database comprising: a parent database table and a child database table having a column configured to reference the parent database table; and (b) a database management system (DBMS) associated with said computerized database, wherein said DBMS is configured, while the computerized database is live, to: create an intermediate database table having a column configured to reference the parent database table; in the child database table: create a column configured to reference the intermediate database table, insert an identifier of the intermediate database table into all fields of the column configured to reference the intermediate database table, and overwrite all fields of the column configured to reference the parent database table with data from the fields of the column configured to reference the intermediate database table.

In some embodiments, the operating of the DBMS further comprises: in the child database table, removing the column configured to reference the intermediate database table, thereby causing the column configured to reference the parent database reference the intermediate database table.

In some embodiments, the DBMS is configured, in the child database table, to remove the column configured to reference the intermediate database table, thereby causing the column configured to reference the parent database reference the intermediate database table.

In some embodiments, the method further comprising, simultaneously with step (b): receiving new data by the DBMS from an application server; and storing the new data, by the DBMS, in at least one of the child database table and the intermediate database table.

In some embodiments, the system further comprises an application server, wherein the DBMS is further configured, simultaneously with step (b), to: receive new data from said application server; and store the new data in at least one of the child database table and the intermediate database table.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 3 illustrates the state of the database of FIG. 1 following execution of a second step of the present method.

DETAILED DESCRIPTION

Disclosed herein is a method for changing a schema tree of a computerized database while the database is live; the method may therefore be referred to as an "online" method. Also disclosed herein are a system and a computer program product embodying the method. The method may be particularly useful for changing the hierarchy of the schema tree, namely, introducing an intermediate node between two existing nodes which have a parent-child relationship. As known in the art, the schema tree is manifested in the database by way of a table embodying each of the nodes of the schema tree, and inter-table references which define the hierarchy. Therefore, in practice, the present method may introduce an intermediate table between two existing tables having a parent-child relationship.

The term "live", as referred to herein with respect to the database, relates to a state of the database in which a DBMS that is associated with the database and is in control thereof, is ready to accept new data from an application server. In practice, this refers to the readiness of the DBMS to immediately execute any query it receives from the application server.

The fact that the changing of the schema tree is performed while the database is live, means that, advantageously, there is no downtime of the database during the change; the DBMS can continue to smoothly and seamlessly execute queries during and following the change, while maintaining backward compatibility for all data received from the application server during the change.

Figure 1:
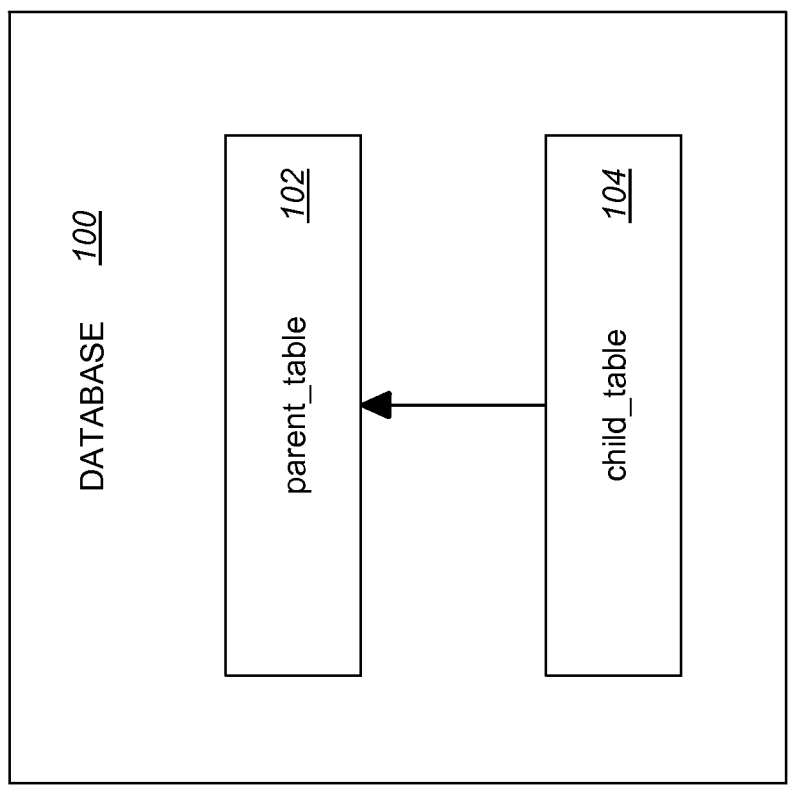
FIG. 1 illustrates an original state of a database.
Figure 2:
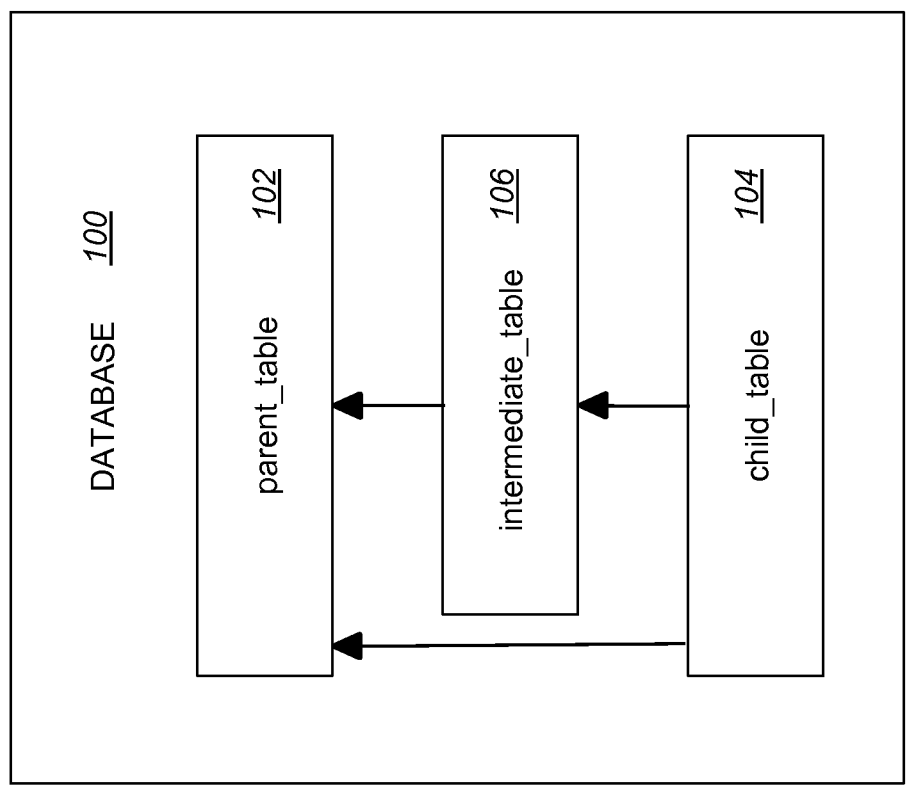
FIG. 2 illustrates the state of the database of FIG. 1 following execution of a first step of the present method.

Reference is now made to FIGS. 1-3, which illustrate three consecutive states of a database 100, when the method of present embodiments is employed. In some embodiments, database 100 is a relational database. Throughout the following description, tables and columns in database 100 may be identified by arbitrary names. It should be noted that these names are only intended to facilitate the present discussions, and have no other significance.

FIG. 1 illustrates, in accordance with some embodiments, an original state of database 100, prior to executing the method. As shown, database 100 includes a parent table 102 and a child table 104. However, those of skill in the art will recognize that this is just a simplified example. In reality, a database may include multiple tables in each hierarchy of the database. For reasons of simplicity and clarity, the present method is exemplified by only two tables, parent table 102 and child table 104, which have a parent-child relationship. This relationship may be manifested by a column in child table 104 which references the parent table. Merely as an example, this column may be named parent_id. Namely, fields belonging to the parent_id column in child table 104 contain an identifier of parent table 102. Continuing upon the previous example, the identifier of parent table 102 may be parent_table.

FIG. 2 illustrates, in accordance with some embodiments, the state of database 100 following execution of a first step of the method. This first step may be executed while the DBMS which controls database 100 is live. The first step may include a sub-step of creating an intermediate table 106 having a column configured to reference parent table 102. The purpose of intermediate table 106 is to allow the grouping of multiple entities such as child table 104. Continuing upon the previous example, an identifier of intermediate table 106 may be intermediate_table.

The following is an example of an SQL (Structured Query Language) query which facilitates the first step. This SQL query has been experimentally tested by the inventors in MySQL, an open source relational database management system (RDBMS) owned by Oracle Corporation of Redwood City, California:

```
1   CREATE TABLE intermediate_table (
2       `uuid` BIGINT (20) NOT NULL DEFAULT '0',
2       `name` VARCHAR (1024),
4       `group_name` VARCHAR (1024),
5       `parent_id` BIGINT (20),
6       PRIMARY KEY (`uuid`)
7   ) ENGINE = INNODB DEFAULT CHARSET = utf8;
```

The 'parent_id' column of intermediate_table is intended and configured to store references to parent_table. For example, parent_table may include a column named 'uuid' (not to be confused with the 'uuid' of intermediate_table), and fields of the 'parent_id' column of intermediate table may contain these 'uuid's of parent_table.

Then, further in the framework of the first step, another sub-step may be executed, which includes, in child_table:

(A) Creating a column configured to reference intermediate_table. This column may be named children_group id, and its reference to intermediate_table may be achieved by including various identifiers of 'uuid's of intermediate_table. The following experimentally-tested SQL query may be used to create the children_group_id column:

```
1   ALTER TABLE campaign
2       ADD COLUMN children_group_id BIGINT (20);
```

(B) Inserting an identifier of intermediate_table, such as its 'uuid's, into all fields which exist in child_table. Namely, all existing rows in child_table will now reference their suitable uuid's in intermediate_table.

(C) Overwriting all fields of the 'parent_id' column of child_table with data from corresponding fields of children_group_id. The following experimentally-tested SQL query may be used to perform this overwriting:

```
1   UPDATE
2       child_table
3   SET
4       parent_id = children_group_id;
```

FIG. 3 illustrates, in accordance with some embodiments, the state of database 100 following execution of a second step of the method. This second step, like the first step, may be executed while the DBMS which controls database 100 is live. It should be noted that the second step is optional. It includes, in child_table, removing the children_group_id_ column, thereby causing the parent_id to be the single reference to intermediate table. This step is optional since, theoretically, it may be possible to leave the children_group_id column as-is and simply cease to address it in future queries from the application server. The following experimentally-tested SQL query may be used to remove the children_group_id column from child table:

```
1   ALTER TABLE campaign
2       DROP COLUMN children_group_id;
```

The present method may be used in a wide range of industrially-applicable processes and systems. For example, the live database schema tree change may be used to introduce a new node to a schema tree of an Internet-connected database used for e-commerce, inventory management and more. As another example, the live database schema tree change may be used to introduce a new node to a schema tree of a database storing online advertising information; for instance, the parent table may contain a list of "accounts", each representing online advertising activity of a single advertiser or advertising agency; the child table may contain a list of "campaigns", each representing an online advertising campaign which may include information as to advertisements, keywords, etc.; and the intermediate table may contain a list of "campaign groups", each representing a certain group of campaigns which is similarly-characterized.

The present invention may be a system, a method, and/or a computer program product. The computer program product may include a computer readable storage medium (or media) having computer readable program instructions thereon for causing a processor or multiple processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for live database schema tree change, the method comprising:
   (a) providing a computerized database comprising:
      a parent database table,
      a child database table having a column configured to reference the parent database table; and
   (b) while the computerized database is live, operating a database management system (DBMS) in control of the computerized database, to:
      create an intermediate database table having a column configured to reference the parent database table;
      in the child database table:
         create a column configured to reference the intermediate database table,
         insert an identifier of the intermediate database table into all fields of the column configured to reference the intermediate database table,
         overwrite all fields of the column configured to reference the parent database table with data from the fields of the column configured to reference the intermediate database table.

2. The method according to claim 1, wherein the operating of the DBMS further comprises:
   in the child database table, removing the column configured to reference the intermediate database table, thereby causing the column configured to reference the parent database reference the intermediate database table.

3. The method according to claim 1, further comprising, simultaneously with step (b):
   receiving new data by the DBMS from an application server; and
   storing the new data, by the DBMS, in at least one of the child database table and the intermediate database table.

4. A computer program product comprising a non-transitory computer-readable storage medium having program code embodied therewith, the program code executable by at least one hardware processor to:
   (a) communicate with a computerized database comprising:
      a parent database table,
      a child database table having a column configured to reference the parent database table; and
   (b) while the computerized database is live, operate a database management system (DBMS) in control of the computerized database, to:
      create an intermediate database table having a column configured to reference the parent database table;
      in the child database table:
         create a column configured to reference the intermediate database table,
         insert an identifier of the intermediate database table into all fields of the column configured to reference the intermediate database table,
         overwrite all fields of the column configured to reference the parent database table with data from the fields of the column configured to reference the intermediate database table.

5. The computer program product according to claim 4, wherein the operating of the DBMS further comprises:
   in the child database table, removing the column configured to reference the intermediate database table, thereby causing the column configured to reference the parent database reference the intermediate database table.

6. The computer program product according to claim 4, further comprising, simultaneously with step (b):
   receiving new data by the DBMS from an application server; and
   storing the new data, by the DBMS, in at least one of the child database table and the intermediate database table.

7. A system comprising:
   (a) a non-transitory storage device having stored thereon a computerized database comprising:
      a parent database table,
      a child database table having a column configured to reference the parent database table; and
   (b) a database management system (DBMS) associated with said computerized database, wherein said DBMS is configured, while the computerized database is live, to:
      create an intermediate database table having a column configured to reference the parent database table;
      in the child database table:
         create a column configured to reference the intermediate database table,
         insert an identifier of the intermediate database table into all fields of the column configured to reference the intermediate database table,
         overwrite all fields of the column configured to reference the parent database table with data from the fields of the column configured to reference the intermediate database table.

8. The system according to claim 7, wherein the DBMS is further configured to:
   in the child database table, removing the column configured to reference the intermediate database table, thereby causing the column configured to reference the parent database reference the intermediate database table.

9. The system according to claim 7, further comprising an application server, wherein the DBMS is further configured, simultaneously with step (b), to:
   receive new data from said application server; and
   store the new data in at least one of the child database table and the intermediate database table.

* * * * *